United States Patent [19]

Miyazaki

[11] Patent Number: 5,001,905
[45] Date of Patent: Mar. 26, 1991

[54] AIR CONDITIONING SYSTEM FOR VEHICLES

[75] Inventor: Kunio Miyazaki, Kohnan, Japan
[73] Assignee: Diesel Kiki Co., Ltd., Tokyo, Japan
[21] Appl. No.: 524,051
[22] Filed: May 16, 1990

[30] Foreign Application Priority Data

May 25, 1989 [JP] Japan .................................. 1-130087

[51] Int. Cl.⁵ ............................................. B60H 1/32
[52] U.S. Cl. ......................................... 62/244; 98/2.11
[58] Field of Search ..................... 62/244; 90/10, 2.11

[56] References Cited

U.S. PATENT DOCUMENTS

| | | | |
|---|---|---|---|
| 3,173,274 | 3/1965 | Dean | 62/244 |
| 4,843,826 | 7/1989 | Malaker | 62/244 X |
| 4,888,959 | 12/1989 | Brown | 62/244 |
| 4,926,655 | 5/1990 | King | 62/244 |

FOREIGN PATENT DOCUMENTS 49-36276 10/1974 Japan .
62-40808 10/1987 Japan .
63-10326 3/1988 Japan .

*Primary Examiner*—Lloyd L. King
*Attorney, Agent, or Firm*—Wenderoth, Lind & Ponack

[57] ABSTRACT

An air conditioning system for use in a vehicle including a baggage room under the floor thereof and a bulk-head in the rear portion thereof, in which the bulk-head has inside and outside air intake ports and exhaust ports respectively communicating with the inside and outside air intake ports, the air blast openings of upper and lower ducts respectively provided in the ceiling and floor portions of a passenger room of the vehicle and a blower are disposed on both sides of the bulk-head, the two blast openings are formed in such a manner that they face the discharge port (air blast port) of the blower, a switching door is interposed between the discharge port and the air blast openings of the upper and lower ducts, the air intake port of the blower is formed in such a manner that it faces inwardly of the bulk-head, the components of an air conditioning unit are stored within the bulk-head, and compressors are disposed just below the bulk-head.

12 Claims, 3 Drawing Sheets

AIR CONDITIONING SYSTEM FOR VEHICLES

BACKGROUND OF THE INVENTION

1. Field of the Invention

The present invention relates to an air conditioning system for a vehicle, such as an air conditioning system for a bus.

2. Description of the Prior Art

In recent years, the distance to be covered by a bus has been increased and, with the increased bus covering distance, the bus has been made increasingly sumptuous. That is, the bus is perfectly equipped not only with an air conditioning system but also with a baggage room for storage of passengers' baggages provided separately from a passengers room, in order to improve the comfort of the passengers room.

Such baggage room is, in general, arranged below the floor of the bus. And, the main components of the air conditioning system are also arranged generally at the engine position of the bus located below the bus floor, as disclosed in Japanese Utility Model Publication No. 62-40808 of Showa. Such centralized or competitive provision of the baggage room and the main components of the air conditioning system, however, sets a limit to the space of baggage room.

Conventionally, in order to solve the above-mentioned problem, for example, Japanese Utility Model Publication No. 63-10326 of Showa discloses an air conditioning system in which a condenser, an evaporator, a blower, a heater core and the like are collectively arranged on the roof of a vehicle which is located in the rear-most portion of the vehicle.

However, in such arrangement, since a compressor disposed within an engine room is a very long way vertically from the condenser and the like, pipings for a refrigerant and heated water must be made longer and a complicated roof is required. That is, the structure and assembling of these components are complicated and the space necessary for provision of them is in general larger.

SUMMARY OF THE INVENTION

The present invention aims at eliminating the drawbacks found in the above-mentioned prior art systems.

Accordingly, it is an object to provide an air conditioning system for use in a vehicle in which the main components of the air conditioning system are stored in a bulk-head located in the rear portion of the vehicle to thereby avoid the competitive arrangement of such main components with respect to a baggage room so as to be able to assure a wide space for the baggage room.

It is another object of the invention to provide an air conditioning system for use in a vehicle in which the main components of the air conditioning system are arranged collectively in a bulk-head located in the rear portion of an vehicle to thereby reduce the space for provision thereof so as to be able to facilitate assembling and maintenance thereof.

It is still another object of the invention to provide an air conditioning system for use in vehicles in which the air to be supplied to a passenger room is once heat exchanged by an all heat exchanger and the heat exchanged air is heat exchanged again by an evaporator or a heater core so as to be able to realize a reasonable and economical air conditioning system.

According to the present invention, there is provided an air conditioning system for use in a vehicle having a baggage room below the floor thereof and a bulk-head in the rear portion thereof, wherein the bulk-head has inside and outside air intake ports and exhaust ports communicating with the air intake ports, there are provided on both sides of the bulk-head the air blast ports of upper and lower ducts respectively disposed in the ceiling and floor portions of a passenger room of the vehicle and a blower, the two air blast ports are opened up facing onto the discharge port (air blast port) of the blower, a switching door is interposed between the discharge port of the blower and the air blast ports of the upper and lower ducts, the blower has an air intake port which is opened up facting inwardly of the bulk-head, an air conditioning unit is stored within the bulk-head, and a compressor is disposed just below the bulk-head.

The foregoing and other objects, characteristics and advantages of the invention will become more apparent in the detailed description in connection with the accompanying drawings.

DETAILED DESCRIPTION OF THE PREFERRED EMBODIMENT OF THE INVENTION

Figure 1:
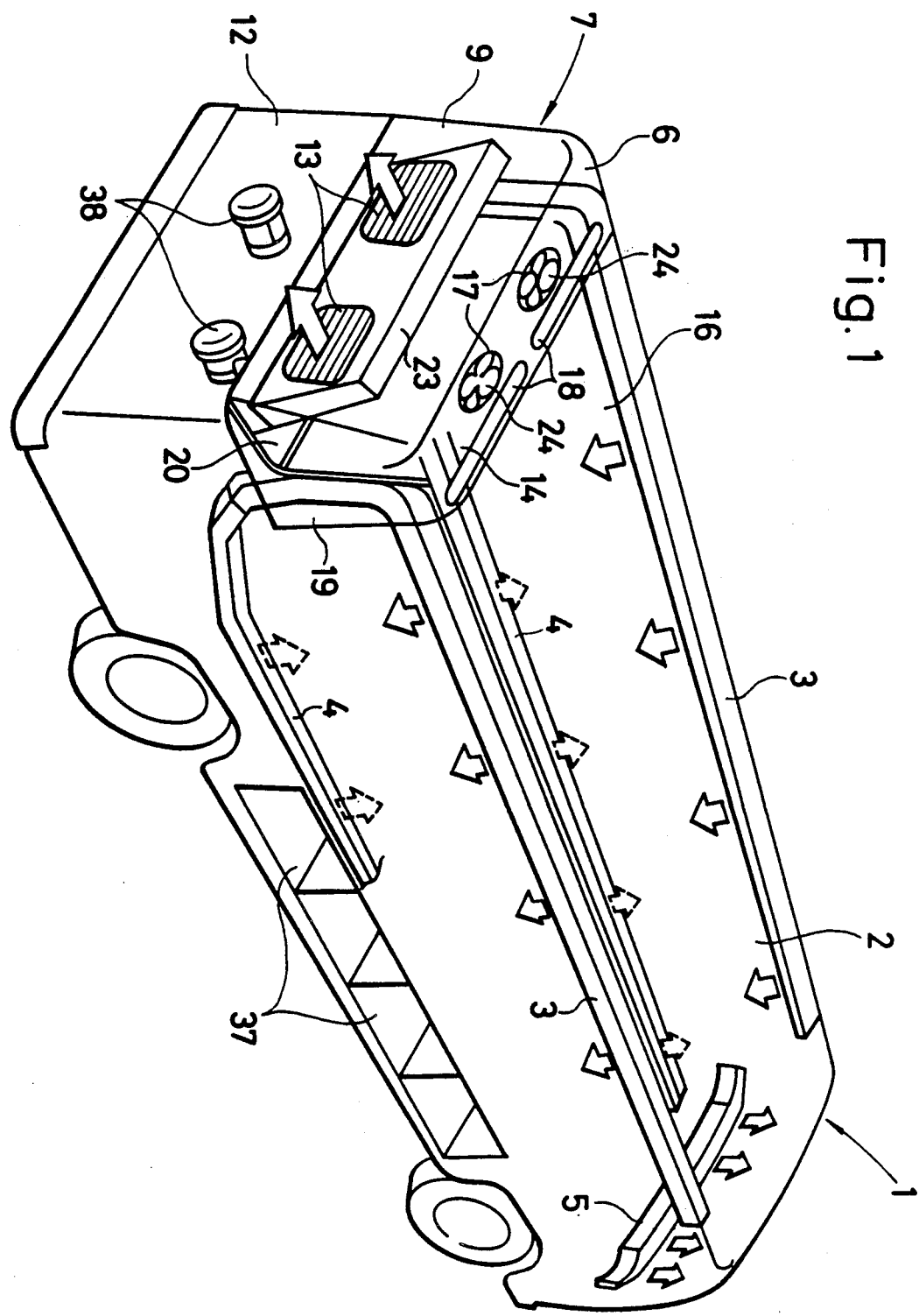
FIG. 1 is an explanatory view of an embodiment of an air conditioning system for use in a vehicle according to the invention.
Figure 2:
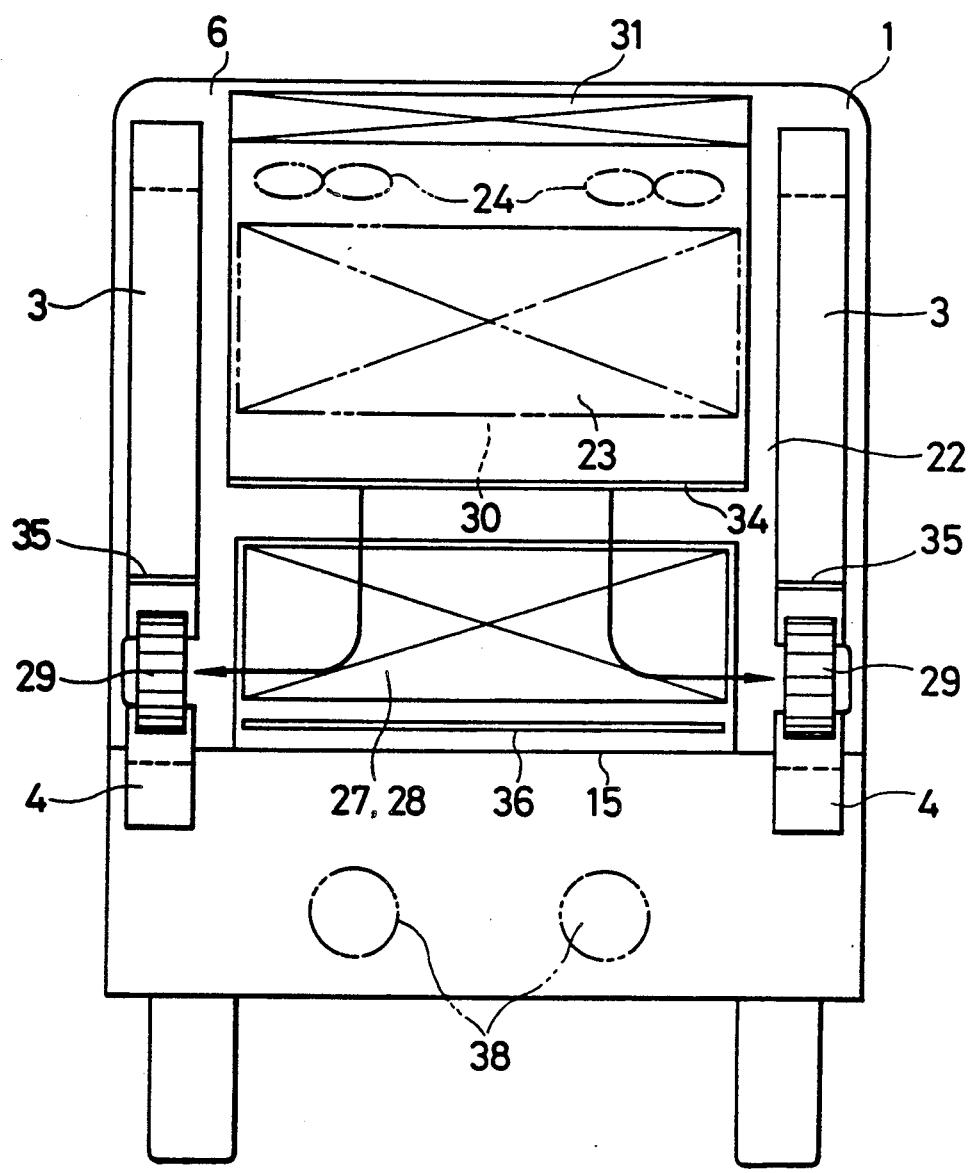
FIG. 2 is an explanatory view to show the condition of a rear bulk-head of a vehicle to which the invention is applied; and, FIG. 3 is an enlarged section view of main portions of an air conditioning system according to the invention.
Figure 3:
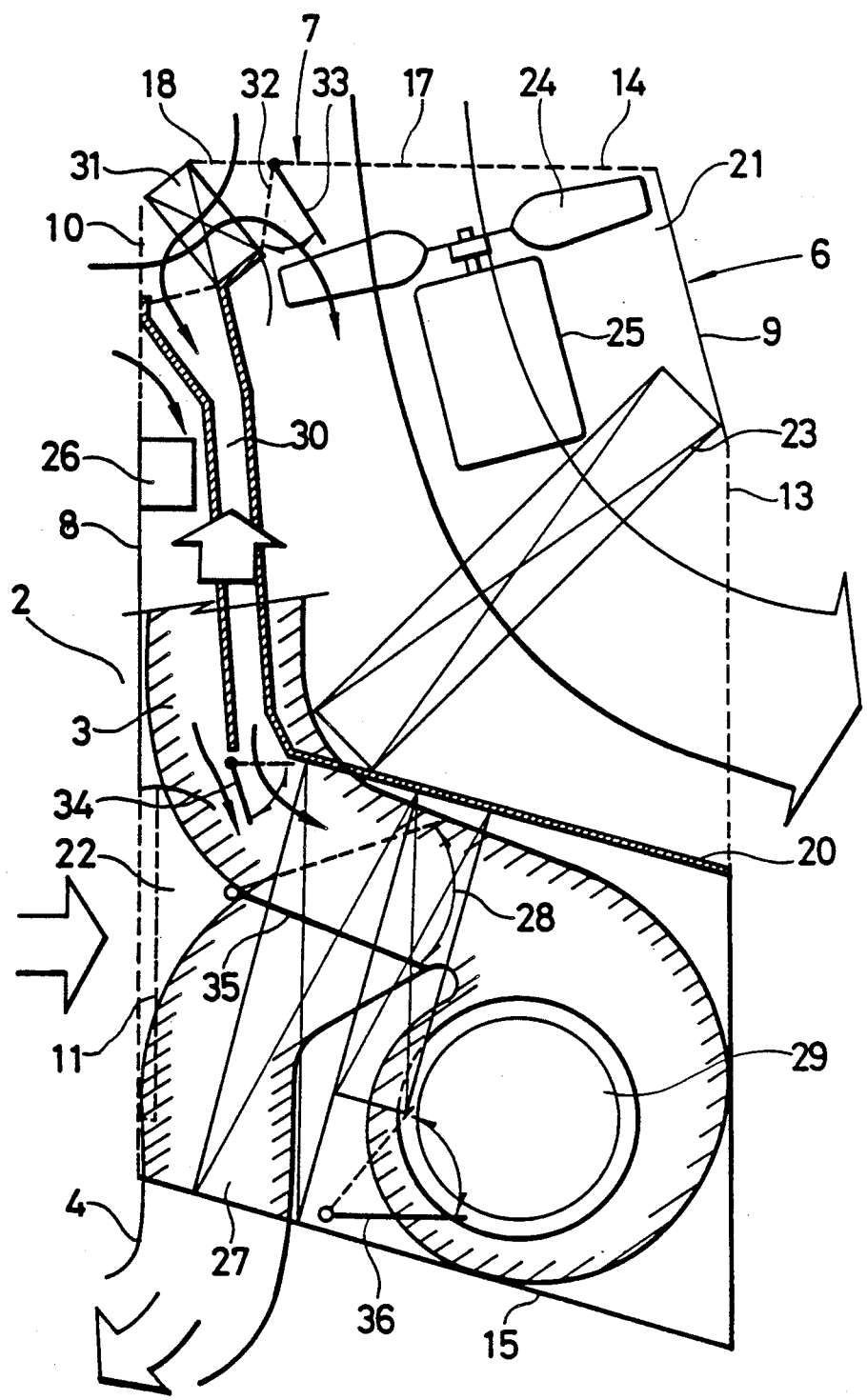

Description will be given below of an illustrated embodiment of an air conditioning system according to the invention which is applied as an air conditioning system for a bus. In FIGS. 1 through 3, reference numeral 1 designates a vehicle, in particular, a bus. The bus 1 has a passenger room 2 which includes a ceiling portion 3. In the ceiling portion 3, there are arranged a pair of upper ducts 3, 3. A pair of lower ducts 4, 4 are disposed on the floor of the passenger room 2 located below the ceiling portion 3. And, in the front portion of the bus 1, there is arranged a front duct 5.

The above-mentioned ducts 3, 4 are extended backwardly of the passenger room 2 and the respective terminal ends of the ducts 3, 4 are connected to an air conditioning unit 7 which is displaced within a bulk-head 6 located in the rear portion of the bus 1.

The above-mentioned bulk-head 6 has front and rear portions which are separated from each other by means of an inner panel 8 and an outer panel 9. In particular, the inner panel 8 is used to partition the rear portion of the passenger room. In the upper and lower positions of the innner panel 8, there are formed inside air intake ports 10, 11, respectively. Also, the outer panel 9 cooperates with a rear panel 12 in forming a rear end peripheral surface of the bus 1. In the middle and high positions of the outer panel 9, there are formed exhaust ports 13, 13, respectively.

The bulk-head 6 is divided into upper and lower portions by means of an upper panel 14 and a lower panel 15. The upper panel 14 cooperates with a roof panel 16 in forming a roof of the bus 1 and, in the upper panel 14, there are formed outside air intake ports 17, 18, respectively. Also, the lower panel 15 is used to close the lower portion of the bulk-head 6 in an air tight manner. The lower ducts 4, 4 are extended downwardly from the front end of the lower panel 15.

The bulk-head 6 had right and left side surfaces which are closed in an air-tight manner by means of side panels 19, 19 forming the rear end peripheral surface of the bus 1. Inside of the bulk-head 6, there is provided a partition wall 20 which has a substantially L-shaped section and extends in the forward and backward directions of the bulk-head 6. The interiors of the bulk-head 6 are divided by the partition wall 20 into first and second heat exchange chambers 21, 22.

The first heat exchange chamber 21 is situated in the upper side of the bulk-head 6 and has exhaust ports 13 and outside air intake ports 17 respectively formed in the upper and lower positions thereof. Upwardly of these ports, there are arranged condenser fans 24. A condenser 23 is disposed just below the fans 24. In the drawing, numeral 25 designates a fan motor.

Also, the second heat exchange chamber 22, as shown in FIG. 3, is formed such that it is bent from the front portion of the bulk-head 6 into the rearward lower portion thereof. The second heat exchange chamber 22 has inside air intake ports 10, 11 in the upper and lower positions. Just below the inside air intake port 10, there is disposed an air purifier 26. And, below the air purifier 26, there are arranged an evaporator 27 and a heater core 2 adjacently to each other.

On both sides of the second heat exchange chamber 22, there are disposed the openings of the upper and lower ducts 3, 4 in a manner to face the air blast port of a blower 29. The air intake port of the blower 29 is opened up facing the second heat exchange chamber 22.

In the drawing, numeral 30 designates an outside air guide duct which is disposed substantially in the upper half section of the second heat exchange chamber 22. The outside air guide duct 30, as shown in FIG. 3, extends along the partition wall 20, has a lower opening which is formed substantially in the middle and upper positions of the heat exchanger 22, and also has an upper opening formed so as to face towards the inside air intake port 10. And, an all heat exchanger 31 is disposed adjacent to the upper opening of the outside air guide duct 30.

In other words, the all heat exchanger 31 is located so as to face the inside and outside air intake ports 10, 18. For example, as disclosed in Japanese Utility Model Publication No. 49-36276 of Showa, the all heat exchanger 31 comprises a recuperative heat exchanger which is composed of a plurality of alternately piled fin plates allowing two fluids to flow counter to each other. One fluid passage of the all heat exchanger 31 is set so as to extend from the inside air intake port 10 toward a ventilation port 32 which is formed in the first heat exchange chamber 21, while the other fluid passage thereof is set so as to extend from the outside air intake port 18 toward the outside air guide duct 30.

Air feed doors 33, 34 are disposed within the opening of the ventilation port 32 and the lower opening of the outside air guid duct 30, respectively, and a switching door 35 is disposed in the boundary between the upper duct 3 and lower duct 4. Further, a reheat air mix door 36 is provided just below the heater core 28. These doors 33, 34, 35 and 36 are controlled by their respective actuators (not shown) such that they can be automatically opened or closed.

The operations of the actuators are controlled by a control unit which includes a microcomputer or the like. To this control unit are input various kinds of information coming from a gas sensor to be described later, inside and outside air temperature sensors and humidity sensors respectively provided within and outside a passenger room, humidity sensors, and a solar radiation sensor. For a desired air conditioning mode operation, in accordance with such information, the control unit operates and determines the amounts of airflow of the inside and outside air intake ports, the amounts of airflow of the cold and warm air blow ports, necessity for ventilation, the temperatures and amounts of airflow of the air blast ports, on/off control of the compressor to be described later, number of the compressors to be operated and the like. Then, the control units outputs control signals representing these data to the respective equipment to be controlled so as to be able to automatically set an air conditioning feeling suitable for the desired air conditioning mode.

For example, the actuators for driving the air feed doors 33, 34, in the ventilation mode running operation thereof, are driven responsive to a signal, for example, sent from a carbon dioxide ($CO_2$) detecting gas sensor (not shown) provided in the passenger room 2 on condition that the fan motor 25 is in operation to be able to control the degrees of opening of the doors 33, 34 according to the density of the gas detected. In this case, the above-mentioned actuators, in the heating operation of the air conditioning system, are driven responsive to a signal indicating the heating mode to be able to control the degrees of opening of the air feed doors 33, 34 according to the temperatures of the passenger room.

Also, the actuator for driving the switching door 35, in the cooling operation of the air conditioning system, is operated to open the door 35 to thereby allow cold air to be sent to the ceiling duct 3 and, in the heating operation of the air conditioning system, is operated to close the door 35, thereby allowing heated air to be sent to the lower duct 4.

Further, the actuator (not shown) for driving the reheat air mix door 36 is driven when the air conditioning system is in the cooling or heating operation. In the full cooling or full heating mode of the air conditioning system, the actuator opens or closes the reheat air mix door 36 fully to thereby allow the full amounts of the cool air or warm air to be sent to the respective ducts and, when the air conditioning system is used in a mild air in spring, summer and the like, the actuator is arranged such that it can control the degree of opening of the reheat air mix door 36 according to a desired air conditioning mode or the temperatures of the passenger room.

In addition, in the drawing, numeral 37 designates a baggage room space provided below the floor of the bus 1, and 38 designates a compressor located just below the bulk-head 6 which can be driven by an engine (not shown) installed adjacent thereto.

In other words, in the air conditioning system for a vehicle constructed in the above-mentioned manner, a series of machines and instruments forming the air conditioning unit 7, including the condenser 23, condenser fan 24, evaporator 27, heater core 28, blower 29, air purifier 26, all heat exchanger 31, reheat air mix door 36 and the like are stored adjacently to one another within the bulk-head 6 in the rear portion of the vehicle, and the compressor 38 is disposed in a position below and adjacent to the air conditioning unit 7, whereby the air conditioning unit 7 including the compressor 38 can be installed in a compact manner.

Therefore, a piping structure including a refrigerant guide pipe and a hot water pipe can be simplified, so that the piping operations of these pipes can be performed with more ease as well as the above-mentioned machines and instruments can be assembled and maintained easily. Also, due to the fact that a series of machines and instruments are stored within the the bulkhead 6 as mentioned above, there is eliminated the need to use the portion under the floor for such components and accordingly a wider space can be secured for the baggage room space 37.

According to the air conditioning system installed in the vehicle 1 such as a bus, by selecting a desired air conditioning mode operation, the control unit initiates its control operation according to the selected air conditioning mode.

In other words, various kinds of information are input to the above-mentioned control unit from the gas sensor for detecting the density of carbon dioxide contained in the passenger room 2, inside and outside air temerature sensors, humidity sensors, solar radiation sensor, and other various sensors. The control unit judges the ever-changing environmental conditions inside and outside of the passenger room in accordance with the information input thereto and then, based on the previously stored air conditioning control information, decides or operates the amount of air of the inside and outside air intake ports, the amount of air of the air blast ports for cold and hot airs, the need for ventilation, the temperatures and amount of air of the air blast ports, the on/off control of the compressors, the number of the compressors to be operated, and the like. That is, the control unit outputs signals, respectively indicating these data, to the respective machines and instruments to be controlled, thereby automatically setting the desired air conditioning mode.

For example, if the strongest cooling mode operation is selected, then the compressor 28 is fully rotated and the blower 29 is rotated at high speeds to thereby increase the amount of air, the reheat air mix door 36 is opened fully through the associated actuator as shown by a solid line in FIG. 3 to thereby fully open the air passage for the blower 29, and the inside air intake ports 10, 11 are selected as air intake ports and the switching door 35 is fully opened through the associated actuator as shown by a solid line in FIG. 3 to thereby select the air passage for the upper duct 3.

Under such condition, if the blower 29 is rotated at high speeds, then the air existing within the passenger room is sucked into the second heat exchanger 22 through the inside air intake ports 10, 11 and the same air is then moved within the heat exchanger 22 toward the blower 29. During such movement, part of the air passes through the air purifier 26 to thereby eliminate the dust therefrom.

The above-mentioned air is then guided into the evaporator 27, where the air is heat exchanged and is thus cooled. The cooled air is sent out through the blower 29 to the upper ducts 3, 3. The cooled air is moved through the ducts 3, 3 and is then blown out into the passenger room 2.

On the other hand, if the fan motor 25 is started to rotate the condenser fan 24 responsive to the air conditioning operation, then the outside air is sucked through the outside air intake port 17 into the first heat exchange chamber 21, the air is heat exchanged, while it passes through the condenser 23, to cool the condenser 23, and the thus heat-exchanged air is then discharged out of the vehicle through the exhaust ports 13, 13.

When the density of carbon dioxide existing within the passenger room 2 reaches a predetermined value during such cooling operation, this condition is detected by the gas sensor (not shown), and the signal indicating this condition is then input to the control unit, then the control unit executes a ventilation mode operation simultaneously with the above-mentioned air conditioning mode operation, and the control unit also outputs its control signals to the actuators (not shown) for driving the air feed doors 33, 34 to drive them, so that the doors 33, 34 are opened as shown by a solid line in FIG. 3. In this case, the number of the compressors 38 to be operated is reduced, in the illustrated embodiment, to one, and the speed of rotation of the blower 29 is also decreased.

When the air feed door 33 is opened in this manner, then the passenger room 2 and the first heat exchange chamber 21 get into communication with each other through the the inside air intake port 10 and an air passage which is formed by the fin plates of all heat exchanger 31, and around the opening of the air feed door 33 there is produced a negative pressure as a result of rotation of the condenser fan 24.

Also, when the air feed door 34 is opened, then the outside air intake port 18 and the second heat exchange chamber 22 get into communication with each other through an air passage, which is formed by the fin plates of all heat exchange chamber 31, and through the outside air guide duct 30.

Therefore, the outside air, which is a hot side fluid, is sucked in through the outside air intake ports 18, 18 by the blower 29, and is then guided guided to the air passage formed by the fin plates of all heat exchanger 31, so that it is caused to move as shown by an arrow in FIG. 3. Also, part of the inside air forming a cold side fluid is guided by the above-mentioned negative pressure to the air passage formed by the fin plates of all heat exchanger 31, so that it is caused to move as shown by a smaller arrow in FIG. 3.

In other words, the above-mentioned inside and outside airs move through all heat exchanger 31 in such a manner that they form counter flows to each other, as shown in FIG. 3 and, during such movements, they exchange heat with each other. In particular, the outside air passes through the all heat exchanger 31 in such a manner that it gets closer in temperature and humidity to the inside air, that is, it is cooled and dehumidified. On the other hand, the inside air passes through the all heat exchanger 31 in such a manner that it sucks the heat of the outside air.

After heat exchange, the outside air is guided by the outside guide duct 30 and moved into the second heat exchange chamber 22. The outside air is then heat exchanged again and is thus cooled in the evaporator 27 of the second heat exchange chamber 22. After then, the cooled air is sent out into the upper duct 3 through the blower 29 and is blown into the passenger room 2.

As mentioned above, in the ventilation operation, due to the fact that the outside air is once cooled and dehumidified by the all heat exchanger 31, that is, the outside air is all heat exchanged, even when it is heat exchanged again in the evaporator 27, heat loads are not increased so greatly, with the result that the load of the compressor 38 can be reduced.

Also, the inside air, after heat exchanged, gets higher in temperature and humidity when compared with itself before heat exchanged, but the inside air remains still lower in temperature than the outside air existing outside the vehicle. Thanks to this, the inside air is able to provide cooling effects when passing through the condenser 23, thereby promoting the heat exchange of the condenser 23.

When an intermediate or slight cooling operation mode is selected instead of the above-mentioned strongest cooling operation mode, then the speed of rotation of the blower 29 and the number of compressors 38 to be operated are adjusted accordingly. Also, in the intermediate periods such as in spring, autumn or the like, the degree of opening of the reheat air mix door 36 is adjusted according to the desired air conditioning mode to thereby control the amount of inflow of the air once cooled by the evaporator 27 to the heater core 28, so as to be able to set the desired passenger room temperatures.

Alternatively, in the above-mentioned cooling operation, instead of the above-described inside air circulation system, it is also possible to open the air feed doors 33, 34 to thereby exchange the heat of the outside air.

Next, referring to the heating operation in winter and the like, if the strongest heating mode is selected, for example, then a hot water pump and a preheater (both of which are not shown) are tuned and a hot water valve (not shown) is opened fully. Also, the blower 29 is rotated at high speeds to thereby increase the amount of air to be supplied and at the same time the reheat air mix door 36 is closed completely through its associated actuator, as shown by a broken line in FIG. 3, so that the full amount of the air guided can be supplied to the heater core 28.

Further, as the air intake ports, the outside air intake ports 18, 18 are selected. Responsive to this selection, the air feed doors 33, 34 are opened fully by means of their associated actuators and the passenger room 2 and the first heat exchange chamber 21 are put into communication with each other by means of the all heat exchanger 31. And, the outside air intake ports 18, 18 are brought into communication with the second heat exchange chamber 22 by means of the all heat exchanger 31 and outside air guide duct 30, and the switching door 35 is closed completely by means of its associated actuator as shown by a broken line in FIG. 3, thereby selecting an air passage for the lower duct 4.

Therefore, under this condition, if the blower 29 is rotated at high speeds, then the outside air forming a cold side fluid is sucked in through the outside air intake ports 18, 18 and is then guided into the all heat exchanger 31. On the other hand, even in the heating operation, the condenser fan 24 is rotated, so that there is produced a negative pressure around the opening of the outside air intake door 33, similarly to the previously described case.

As a result of this, the passenger room air forming a hot side fluid is sucked out through the inside air intake port 10 and it is then moved toward the outside air intake door 33 within the all heat exchanger 31.

In other words, the above-mentioned inside and outside airs move within the air passage formed by the fin plates of the all heat exchanger 31 while forming counter flows with respect to each other as shown in FIG. 3. During such counter-flow movements, the inside and outside airs exchange heat with each other. That is, the outside air absorbs the heat of the inside air and is thus heated up to the temperatures close to the passenger room temperatures, while the inside air is cooled because the heat thereof is absorbed by the outside air.

After the above-mentioned heat exchange, the outside air is guided by the outside air guide duct 30 and is thus moved to the second heat exchange chamber 22. Then, the full amount of the outside air is guided through the reheat air mix door 36 of the second heat exchange chamber 22 to the heater core 28, in which it is heat exchanged again and is thus heated. The thus heated air is then sent out to the lower ducts 4, 4 by means of the blowers 29, 29 and is blown into the passenger room 2.

On the other hand, the inside air, after passing through the air feed door 33, joins the outside air which has flown into the first heat exchange chamber 21 through another outside air intake port 17, and the thus jointed air is then exhausted out of the vehicle.

As can be seen from the foregoing description, in the above-mentioned heating operation, since the outside air is once heated by the all heat exchanger 31 and after then the thus heated outside air is heat exchanged or heated again by the heater core 28, the heating can be executed in an efficient manner. In addition to such efficient heating, due to use of part of the inside air for ventilation or exhaustion, a reasonable and economical heating system can be realized.

Alternatively, however, in front of the upper ducts 3, 3, there may be arranged high level fans (not shown) respectively capabel of guiding the outside air and high level doors respectively capable of opening and closing the ducts 3, 3. That is, in such air conditioning that requires no great heating, the high level fans and doors are operated to thereby blow out cold air from the upper ducts 3, 3, so that it is possible to set an air conditioning state which keeps the head cool and the feet warm.

What is claimed is:

1. An air conditioning system for use in a vehicle (1) including a baggage room (37) located under the floor thereof and a bulk-head (6) located in the rear portion thereof, wherein:

said bulk-head (6) has inside and outside air intake ports (10, 11, 17) and exhaust ports (13) communicating with said inside and outside air intake ports;

the air blast openings of upper and lower ducts (3, 4) respectively arranged in the ceiling and floor portions of said vehicle (1) and a blower (29) are disposed on both sides of said bulk-head (6);

said two air blast openings are formed so as to face the discharge opening (air blast opening) of said blower (29);

a switching door (35) is interposed between said blower discharge opening and the air blast openings of said upper and lower ducts (3, 4);

the air intake opening of said blower (29) is formed so as to face inwardly of said bulk-head (6);

the following components of a control unit (7) are stored within said bulk-head (6);

(a) a condenser fan (24) for sucking in the outside air through said outside air intake port (17) and a fan motor (25) for driving said condenser fan (24);

(b) a condenser (23);

(c) an evaporator (27);

(d) a heater core (28); and, (e) a reheat air mix door (36); and, a compressor (38) is disposed just below said bulk-head.

2. An air conditioning system for use in a vehicle as set forth in claim 1, wherein said vehicle (1) is a bus.

3. An air conditioning system for use in a vehicle as set forth in claim 1, wherein an air purifier (26) is disposed within said bulk-head (6).

4. An air conditioning system for use in a vehicle (1) including a bulk-head (6) in the rear portion thereof, wherein:
- said bulk-head (6) has inside air intake ports (10, 11, 17), outside air intake ports (18) formed adjacent to and communicable with said inside air intake port (10), and exhaust ports (13) respectively communicable with said inside and outside air intake ports (10, 11, 17, 18);
- an air feed door (33) is interposed between said outside air intake ports (18) and said inside air intake port (17) in such a manner that it can be opened and closed;
- said inside and outside air intake ports (10, 11, 17, 18) are brought into communication with said exhaust ports (13), respectively, when said air feed door (33) is opened;
- said inside and outside air intake ports (10, 11, 17, 18) are cut off from communication with said exhaust ports (13), respectively, when said air feed door (33) is closed;
- the air blast openings of upper and lower ducts (3, 4) respectively arranged in the ceiling and floor portions of said vehicle (1) and a blower (29) are disposed on both sides of said bulk-head (6);
- said two blast openings are formed so as to face the discharge opening (air blast opening) of said blower (29);
- a switching door (35) is interposed between said blower discharge opening and said blast openings of said upper and lower ducts (3, 4);
- the air intake opening of said blower (29) is formed so as to face inwardly of said bulk-head (6);
- the following components of a control unit (7) are stored within said bulk-head (6);
  - (a) a condenser fan (24) for sucking in the outside air through said outside air intake port (17) and a fan motor (25) for driving said condenser fan (24);
  - (b) a condenser (23);
  - (c) an evaporator (27);
  - (d) a heater core (28); and,
  - (e) a reheat air mix door (36);
- said condenser fan (24) is disposed adjacent to the opening side of said air feed door (33);
- a compressor (38) is disposed just below said bulk-head (6);
- an outside air guide duct (30) is disposed between said outside air intake port (18) and said evaporator (27);
- one opening of said outside air guide duct (30) is formed so as to face said inside and outside air intake ports (10, 18);
- an air feed door (34), which can be brought into and cut off from communication with said evaporator (27), is disposed in the other opening of said outside air guide duct (30) in such a manner that it can be opened and closed;
- an all heat exchanger (31) is disposed in a portion where air passages respectively formed by said inside and outside air intake ports (10), (18), exhaust port (13) and outside air guide duct (30) intersect with one another;
- said all heat exchanger (31) is arranged such that two fluids can be moved in two counter flows for mutual heat exhange; and,
- one of said two fluids, after said heat exchange, is guided to said evaporator (27) or said heater core (28), and the other fluid, after said heat exchange, is exhausted externally of said vehicle through said exhaust ports.

5. An air conditioning system as set forth in claim 4, wherein said vehicle (1) is a bus.

6. An air conditioning system as set forth in claim 4, wherein an air purifier (26) is disposed within said bulk-head (6).

7. An air conditioning system for use in a vehicle as set forth in claim 4, wherein, when said air conditioning system is switched into a ventilation mode during the cooling operation thereof, said air feed doors (33, 34) are opened to thereby guide the outside air through said blower (29) to the side of said evaporator (27) and to thereby guide the inside air to the side of said condenser (23) by means of a negative pressure produced by said condenser fan (24), said inside and outside airs being guided through said all heat exchanger (31).

8. An air conditioning system for use in a vehicle as set forth in claim 7, wherein said outside air, after it has passed through said all heat exchanger (31), can be controlled such that the temperature and humidity thereof are substantially the same as those of said inside air.

9. An air conditioning system for use in a vehicle as set forth in claim 7, wherein the number of said compressors (38) are reduced.

10. An air conditioning system for use in a vehicle as set forth in claim 7, wherein the speed of rotation of said blower (29) is reduced.

11. An air conditioning system for use in a vehicle as set forth in claim 7, wherein, when said air conditioning system is in the heating operation thereof, said air feed doors (33, 34) are opened to thereby guide the outside air through said blower (29) to the side of said heater core (28) and to thereby guide the inside air to the side of said condenser (23) by means of a negative pressure produced by said condenser fan (24), said inside and outside airs being guided through said all heat exchanger (31).

12. An air conditioning system for use in a vehicle as set forth in claim 11, wherein said outside air, after it has passed through said all heat exchanger (31), can be controlled such that the temperature thereof is substantially the same as that of said inside air.

* * * * *